INVENTOR.
LOREN G. WRIGHT
BY
Townsend and Townsend
ATTORNEYS

INVENTOR.
LOREN G. WRIGHT
BY
Townsend and Townsend
ATTORNEYS

United States Patent Office 3,495,186

Patented Feb. 10, 1970

3,495,186

SOLID STATE POWER SUPPLY

Loren G. Wright, Castro Valley, Calif., assignor to Q, Inc., Mountain View, Calif., a corporation of California Filed Mar. 6, 1968, Ser. No. 710,890
Int. Cl. H03b 3/02
U.S. Cl. 331—109 12 Claims

ABSTRACT OF THE DISCLOSURE

A solid state radio frequency high voltage power supply is disclosed wherein the RF voltage is generated by a push-pull oscillator and amplification of the RF voltage is provided by a series tuned or series tuned to parallel tuned tank circuit. Power feedback from the tank circuit to support oscillation is first amplified to minimize power dissipation of tank circuit energy. The RF output from the tank circuit is modulated in a program envelope and a DC component inserted into the tank circuit output. An error signal is generated for feedback control of the modulated output and the ratio of RF voltage to DC voltage.

This invention relates to a new and improved solid state radio frequency high voltage power supply suitable for use with quadrupole mass spectrometers and other devices where small amounts of power are required.

It is an object of the present invention to provide high radio frequency voltages in the order of 5,000 volts and greater for power supply to the rods of a quadrupole spectrometer. Another object of the invention is to provide means for modulating the RF voltage according to a program signal to establish the desired electrostatic field configuration between the rods of the quadrupole spectrometer.

A further object of the invention is to provide a DC voltage component in the output of the power supply for application across the rods of the quadrupole spectrometer, and also to provide means for accurate control of the ratio of RF voltage to DC voltage across the rods of the quadrupole spectrometer.

The invention is further intended to provide generally a high voltage RF power supply for devices where very small amounts of power are required.

In order to accomplish these results the present invention contemplates the provision of a solid state push-pull oscillator operating into either a series tuned or a series tuned to parallel tuned tank circuit having a high effective Q to thereby provide a high resonant rise in voltage across the output from the tank circuit. According to another aspect of the invention, power feedback from the tank circuit to support oscillation is first amplified by a solid state amplifier stage to minimize power dissipation of the tank circuit energy. The collector emitter circuits of the push-pull oscillator are modulated by a signal of programmed voltage designed to produce the desired field configuration between the rods of a quadrupole spectrometer across which the output of the power supply is connected. A DC voltage is applied across the output of the power supply so that a DC voltage component is also applied across the rods of the quadrupole spectrometer. The invention further contemplates generating an error signal by a full wave detector at the power supply output which is utilized to provide feedback control of the modulating RF envelope and the ratio of the RF voltage to the DC voltage applied across the rods of the quadrupole spectrometer.

Other features, objects and advantages of the present invention will become apparent in the following specification and accompanying drawings.

Figure 1:
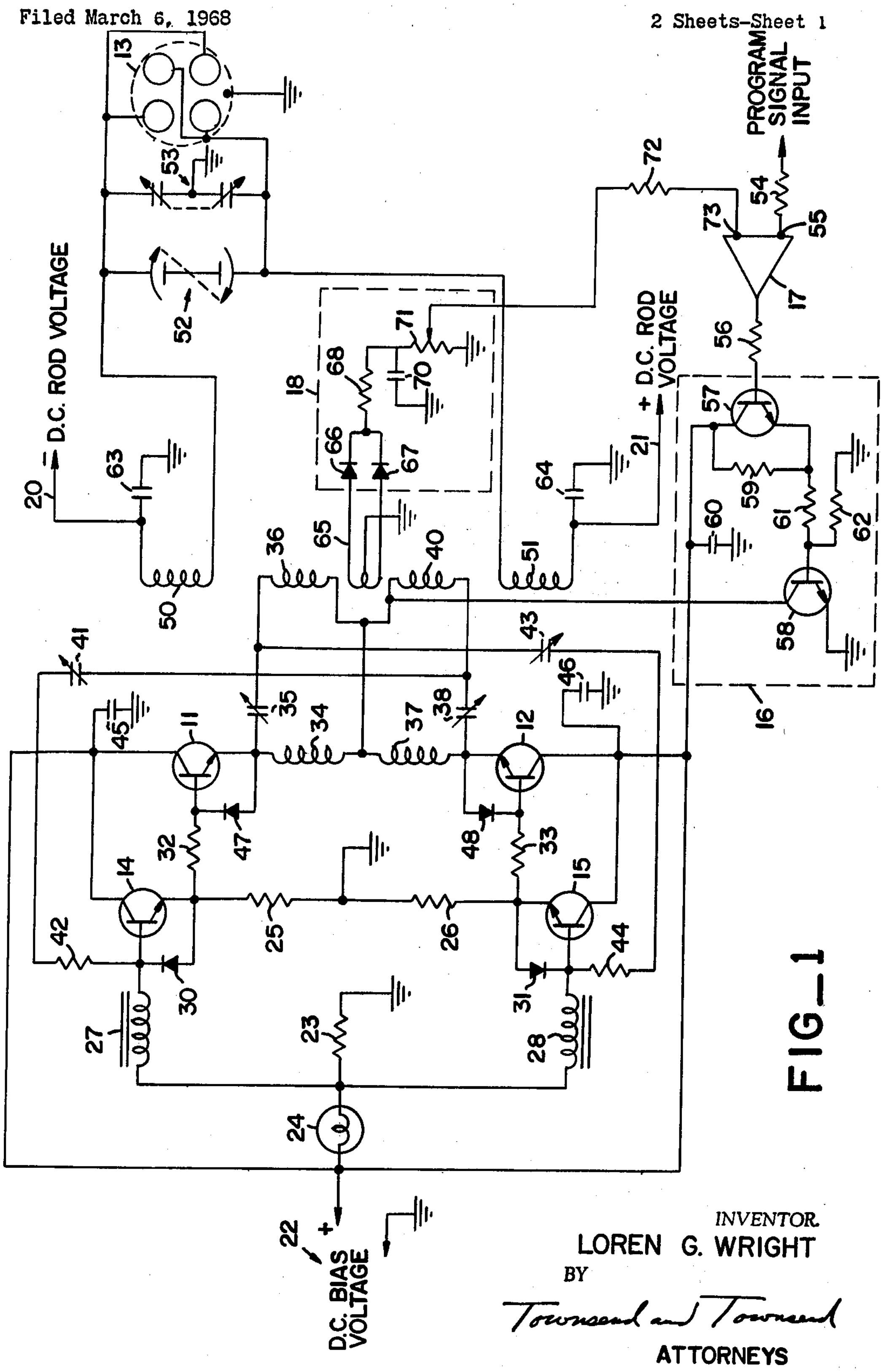
FIG. 1 is a schematic diagram of one form of circuit embodying the present invention.

In the embodiment of the present invention illustrated in FIG. 1 there is provided generally a push-pull oscillator comprising power transistors 11 and 12 operating into a series tuned to parallel tuned tank circuit whose output is applied across the opposing rods of quadrupole spectrometer 13. Power feedback from the tank circuit necessary to support oscillation of the power transistors 11 and 12 is amplified by the single power amplification stage provided by transistors 14 and 15 connected in emitter follower circuits and resistance coupled to the inputs of the respective oscillating power transistors. The collector emitter circuits of the push-pull oscillator are modulated by the modulator 16 to provide a programmed RF envelope supplied through error amplifier 17. An error signal is generated by a full wave RF detector 18 and connected to the other input of error amplifier 17 to thereby provide feedback control of the power supply output. A DC voltage component may be applied across the rods of quadrupole 13 through leads 20 and 21.

Transistors 14 and 15 are connected in emitter follower circuits to provide amplification of the power feedback from the tank circuits of oscillator transistors 11 and 12, necessary to sustain oscillation. Bias voltages and currents for the transistors are supplied by a 28 volts DC source 22 whose positive terminal is connected to the collectors of the transistors. Negative bias for the bases of the transistors is provided by resistor 23 and hot filament bulb 24 which are connected across the 28 volts DC source and act as a voltage divider. The hot filament bulb 24 acts as a variable resistance as hereinafter described. The resistors 25 and 26 of high resistance stabilize the respective emitter currents of transistors 14 and 15. Choke coils 27 and 28 block RF votlages from the DC biasing circuits, while the diodes 30 and 31 short circuit reverse voltages from the emitter to the base to prevent the transistors from burning out. The outputs of transistors 14 and 15 are coupled to the inputs of transistors 11 and 12 through resistors 32 and 33, respectively.

The RF emitter output current from transistor 11 through coil 34 produces a voltage across the variable capacitor 35 and transformer primary coil 36 which comprise a series tuned tank circuit for transistor 11. The RF output emitter current from transistor 12 through coil 37 produces a voltage across variable capacitor 38 and transformer primary coil 40 which provide a series tuned tank circuit for transistor 12.

Variable capacitor 41 provides feedback of power from the tank circuit of transistor 12 to the base of transistor 14 through a resistor 42 which limits current to the base to protect the transistor. Variable capacitor 43 provides feedback of power from the tank circuit of transistor 11 to the base of transistor 15 through resistor 44 which limits current to the base to protect the transistor. Transistors 15 and 14 provide amplification of the power feedback to a level necessary to sustain oscillation.

DC biasing of the oscillator power transistors 11 and 12 is also provided by the 28 volts DC source whose positive terminal is connected the collectors of the respective transistors. Capacitors 45 and 46 provide RF bypasses to ground to prevent RF energy from entering the DC biasing circuits for all the transistors. Diodes 47 and 48 short circuit reverse voltages from emitter to the base to prevent power transistors 11 and 12 from burning out.

Application of power feedback necessary to sustain oscillation heretofore described shifts the operating point of the transistors towards Class A operation if a constant resistance is used in place of the hot filament bulb 24.

However, upon application of power feedback, the hot filament bulb 24 automatically goes to a higher resistance thereby changing the DC bias from the transistors, shifting the operating points of the transistors toward Class C operation. Hot filament bulb 24 thus acts as an automatic variable resistance under feedback, altering the transistor biasing.

Because of the push-pull coupling of oscillating transistors 11 and 12, the voltage at the respective emitters is approximately 56 volts, twice the applied DC biasing voltage. With series tuned resonant tank circuits having a Q in the order of 5 or 6, a resonant rise in voltage is produced across the transformer primary coils 36 and 40 in the order of 280 volts RF.

Transformer secondary coils 50 and 51 inductively coupled to transformer primary coils 36 and 40 provide a further step-up in voltage and are connected in parallel across variable capacitors 52 and 53 to provide a coupled parallel tuned resonant circuit. Variable capacitor 52 may be a differential dual capacitor for RF voltage balance, while variable capacitor 53 may be a linear RF tuning dual capacitor for adjusting the operating frequency. For example, an operating frequency in the 3 megahertz range may be used to provide a mass spectrum range up to mass 200. With a tuned parallel resonant circuit having a Q in the order of 20, a resonant rise in voltage is produced across the coils and capacitors in the order of 5,600 volts and greater. This output is applied across opposite rods of the quadrupole spectrometer 13.

In order to provide the desired electrostatic field configuration between the rods of the quadrupole spectrometer, the RF output of the push-pull oscillator is modulataed by a programmed voltage coupled through resistor 54 to the input 55 of error amplifier 17. The error amplifier is an integrated circuit operational amplifier having two inputs. The signal to one input is inverted so that the difference between the two signals at the input is amplified. The modulating program signal is applied to the non-inverting side of the error amplifier, the output of which is coupled through resistance 56 to the input of modulator 16.

Modulator 16 consists of transistors 57 and 58 which amplify the modulating signal and apply it to the collector emitter circuits of the push-pull oscillator. Transistor 57 provides power amplification to drive the power transistor 58. DC biasing of transistor 57 is provided by the 28 volts DC source whose positive terminal is connected to the collector of transistor 57 and the resistor 59 of high resistance. Capacitor 60 provides an RF bypass to ground to prevent RF from entering the DC biasing circuit. The emitter output from transistor 57 is coupled through resistance 61 to the base of power transistor 58 and further biasing is provided by resistor 62. The collector of transistor 58 is connected to the center tap of transformer primary coils 36 and 40 while the emitter of transistor 58 is connected to ground to thereby modulate the collector emitter circuits of the push-pull oscillator and produce the desired envelope for the generated RF to be applied across the rods of the quadrupole spectrometer.

A DC voltage component necessary for operation of the quadrupole spectrometer may be applied through leads 20 and 21 across the rods of the spectrometer. Thus, a positive DC voltage bias may be applied at lead 21 and a negative DC voltage bias applied at lead 20. The leads 20 and 21 are connected into the parallel tuned resonant circuit adjacent the large capacitors 63 and 64 connected to ground. The capacitors 63 and 64 provide low RF voltage at this point in the power supply output due to the large bypass to ground thereby permitting insertion of the DC voltage signal component at that point.

An error signal is generated from the modulated RF output from the push-pull oscillator by detector 18 including a small transformer secondary coil 65 inductively coupled to transformer primary coils 36 and 40. The induced signal in coil 65 is passed through a full wave rectifier including diodes 66 and 67 and a filter including resistor 68 and capacitor 70. A fractional portion of the filtered signal is tapped by variable potentiometer 71 to provide the error signal for feedback control which is coupled through resistor 72 to the second input 73 of error amplifier 17. The error signal not only provides feedback control of the modulated RF output applied across the rods of the quadrupole spectrometer, but also maintains the ratio of RF voltage to DC voltage applied to the rods of the quadrupole spectrometer necessary for proper operation.

Figure 2:
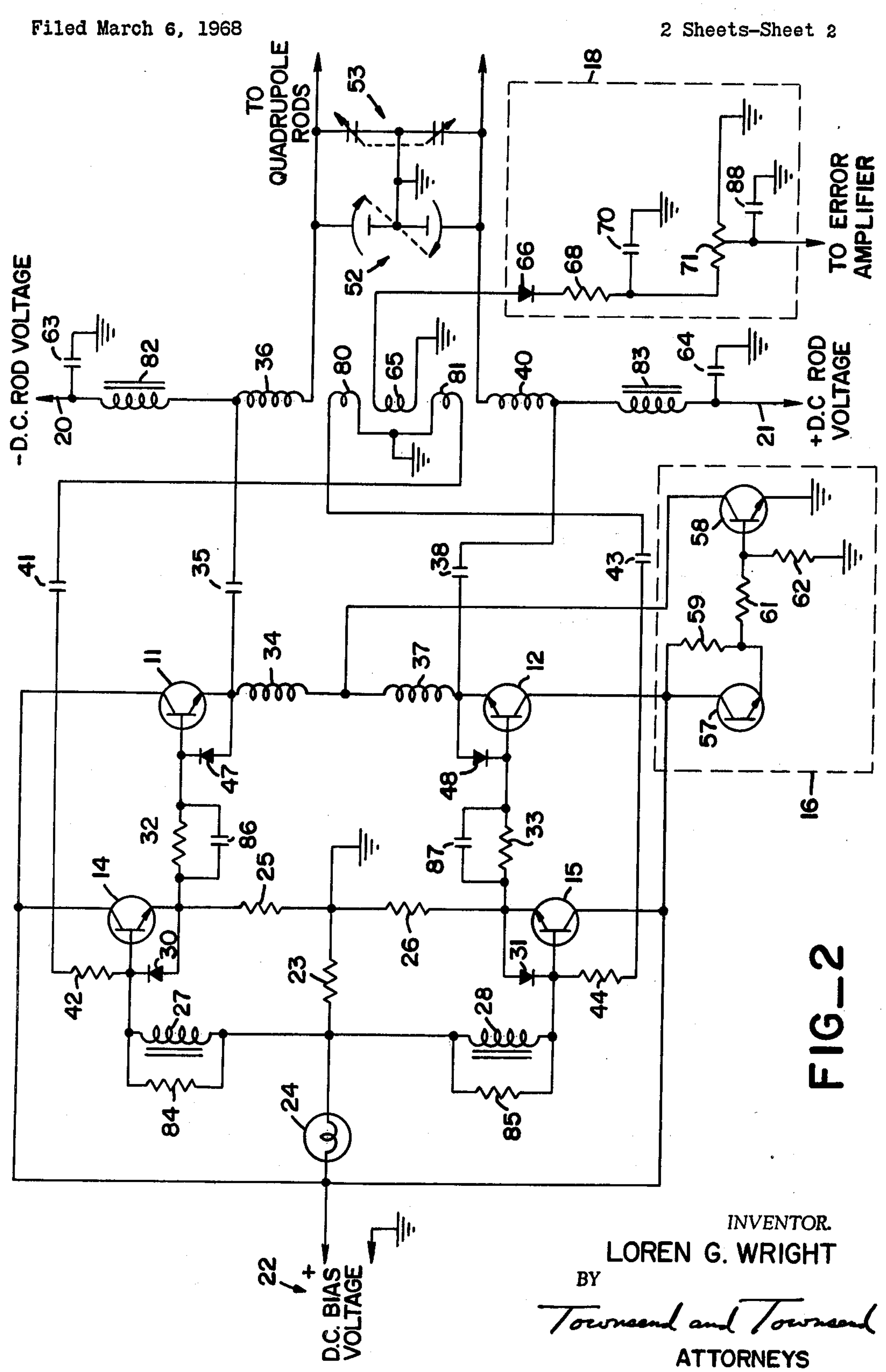
FIG. 2 is a schematic diagram of another form of circuit embodying the present invention.

In the embodiment of the present invention illustrated in FIG. 2 there is provided a high voltage RF power supply similar to that illustrated in FIG. 1 except that the series tuned tank circuits in the output of the push-pull oscillator are coupled directly across the rods of the quadrupole mass spectrometer. Elements of the circuit illustrated in FIG. 2 are provided with the identical numbers of corresponding elements in the circuit illustrated in FIG. 1. The output voltage from the push-pull oscillator comprising transistors 11 and 12 appearing across the transformer primary coils 36 and 40, however, are coupled directly to the quadrupole rods. Additionally, feedback necessary to support oscillation is taken from transformer secondary coils 80 and 81, inductively coupled to the series tuned tank circuits of the push-pull oscillator rather than being taken directly from the tank circuits.

Other minor differences include the addition of choke coils 82 and 83 at the DC rod voltage inputs 20 and 21 to block RF voltage from the DC voltage source. Relatively high resistances 84 and 85 are also provided coupled across choke coils 27 and 28 in the bias circuit of transistors 14 and 15. Capacitors 86 and 87 of high capacitance are coupled across the coupling resistors 32 and 33 between transistors 14 and 11 and 15 and 12, respectively. Capacitor 88 is also provided for further filtering in the RF detector circuit.

In order to provide a sufficient resonant rise in voltage in the tank circuits of the output of the push-pull transistor oscillator so that RF voltage in excess of 5,000 volts may be applied across the quadrupole rods, a high Q in the order of 100 is provided in the series turned tank circuits.

Representative values for the circuit elements for the circuits illustrated in FIGS. 1 and 2, for operation in the 3 megahertz range in order to cover the mass range up to mass 200, are given by way of example in the follow-table.

| Element | FIG. 1 | FIG. 2 |
|---|---|---|
| 11,12 | 2N2876 | 2N2876. |
| 14, 15 | 2N699 | 2N3440. |
| 17 | Motorola MC 1433 | Motorola MC 1433. |
| 23 | 39Ω | 39S. |
| 24 | GE–1819 | GE–1819. |
| 25, 26 | 4.7 K | 4.7 K. |
| 27, 28 | 40 μhy | 40 μhy. |
| 30, 31 | IN 3731 | IN 3731. |
| 32, 33 | 330 Ω | 330 Ω. |
| 34, 37 | 9 turns ⅜″ dia. #14 wire | 12 turns ⅜″ dia. #14 wire. |
| 35, 38 | 550–1,600 pfd | .01 μfd. |
| 36, 40 | 2 turns air dux coil 3″ dia., 10 turns/inch. | 26 turns air dux coil #2410. |
| 41, 43 | 7–45 pfd | 150 pfd. |
| 42, 44 | 5.1 K | 10 μΩ. |
| 45, 46 | .1 μfd | |
| 47, 48 | IN 3731 | IN 3731. |
| 50, 51 | 25 furns air dux coil 3″ dia., 10 turns/inch. | |
| 54 | 10 K | |
| 56 | 10 K | |
| 57 | 2N4238 | 2N4238. |
| 58 | 2N3713 | 2N3713. |
| 59 | 10 K | 10 K. |
| 60 | .1 μufd | |
| 61 | 47 Ω | 47 Ω. |
| 62 | 100 Ω | 100 Ω. |
| 63, 64 | .1 μfd | .01 μfd. |
| 65 | 2 turns air dux coil 3″ dia., 10 turns/inch. | 2 turns air dux coil #2410. |
| 66, 67 | IN 3731 | Element 66, IN 3731. |
| 68 | 30 K | 30 K. |
| 70 | 330 pfd | 10 pfd. |
| 71 | 50 K | 50 K. |
| 72 | 10 K | |

| Element | FIG. 1 | FIG. 2 |
|---|---|---|
| 80, 81 | | 1 turn air dux coil #2410. |
| 82, 83 | 1 mhy | |
| 84, 85 | 1.8 K | |
| 86, 87 | 2,000 pfd | |
| 88 | 500 pfd | |

Although the two embodiments of the present invention disclosed herein have been described for use with quadrupole mass spectrometers, they also have application as high voltage RF power supplies for devices which require very small amounts of power. Other adaptations and modifications of the invention would also be apparent without departing from the true spirit and scope of the following claims.

What is claimed is:

1. A solid state RF power supply comprising: RF oscillator means operating into series tuned resonant tank circuit means; parallel tuned resonant circuit means inductively coupled to the series tuned resonant tank circuit means and across which the load is coupled; amplifier means for amplifying power feedback from the tank circuit means of the oscillator means to a level necessary to sustain oscillation while reducing power dissipation of tank circuit energy.

2. A solid state RF power supply as set forth in claim 1 wherein there is also provided modulating means having an input and an output and wherein the output is coupled to said oscillator means whereby the RF output if the oscillator means is modulated according to a predetermined modulating signal at the input to said modulating means; and RF detector means coupled to the modulated RF output of the oscillator means whereby and error signal is generated for feedback control of the modulated RF output.

3. A solid state RF power supply as set forth in claim 2 wherein there is also provided an error amplifier having two inputs to one of which inputs is connected the error signal and to the other of which inputs is connected a predetermined program signal and having an output connected to the input of said modulating means.

4. A solid state RF power supply as set forth in claim 1 wherein said oscillator means is a push-pull oscillator comprising first and second transistors, operating into first and second series tuned resonant tank circuits respectively.

5. A solid state RF power supply as set forth in claim 4 wherein there is also provided an amplifier stage comprising third and fourth transistors having outputs respectively coupled to the inputs to said first and second push-pull oscillator transistors, and wherein power feedback from the first tank circuit is coupled to the input of said fourth transistor and wherein power feedback from the second tank circuit is coupled to the input of said third transistor whereby power feedback is amplified to a level necessary to sustain oscillation and power dissipation of tank circuit energy is reduced.

6. A solid state RF power supply as set forth in claim 5 wherein said third and fourth transistors are respectively connected in emitter follower circuits.

7. A solid state RF power supply as set forth in claim 1 wherein there is provided means for adding a DC voltage component to the power supply output and wherein said error signal also provides means for feedback control of the ratio of RF output voltage to DC output voltage.

8. A solid state RF power supply comprising: RF oscillator means operating into series tuned resonant tank circuit means; amplifier means amplifying power feedback from the tank circuit means of the oscillator means to a level necessary to sustain oscillation while reducing power dissipation of tank circuit energy; modulating means having an input and an output wherein the output is coupled to said oscillator means whereby the RF output of the oscillator means is modulated according to a predetermined modulating signal at the input to said modulating means; RF detector means coupled to the modulated RF output of the oscillator means whereby an error signal is generated for feedback control of the modulated RF output from said oscillator means; and an error amplified means having two inputs to one of which inputs is connected the error signal and to the other of which inputs is connected a predetermined program signal and having an output connected to the input of said modulating means.

9. A solid state RF power supply comprising: push-pull oscillator means comprising first and second transistors operating into first and second series tuned resonant tank circuits respectively; and amplifier means comprising third and fourth transistors having outputs respectively coupled to the inputs to said first and second push-pull oscillator transistors and wherein power feedback from the first tank circuit is coupled to the input of said fourth transistor and wherein power feedback from the second tank circuit is coupled to the input of said third transistor whereby power feedback is amplified to a level necessary to sustain oscillation and power dissipation of said tank circuit energy is minimized.

10. A solid state RF power supply as set forth in claim 9 wherein there is provided means for adding a DC voltage component to the power supply output.

11. A solid state RF power supply as set forth in claim 9 wherein there is also provided modulating means having an input and an output and wherein the output is coupled to said oscillator means whereby the RF output of the oscillator means is modulated according to a predetermined modulating signal at the input to said modulating means.

12. A solid state RF power supply as set forth in claim 11 wherein there is also provided RF detector means coupled to the modulated RF output of the oscillator means whereby an error signal is generated for feedback control of the modulated RF output.

References Cited

UNITED STATES PATENTS

| | | | |
|---|---|---|---|
| 3,008,068 | 11/1961 | Wilting et al. | 331—114 |
| 3,327,199 | 6/1967 | Gardner et al. | 331—113.1 |
| 3,412,311 | 11/1968 | Siedband | 331—113.1 |

JOHN KOMINSKI, Primary Examiner

U.S. Cl. X.R.

88—14; 321—18; 331—114, 117, 68, 183